April 7, 1925.  
R. A. WEAGANT  
RADIO SIGNALING SYSTEM  
Original Filed Feb. 7, 1919    2 Sheets—Sheet 1

1,532,356

INVENTOR
Roy Alexander Weagant
BY
Herbert G. Ogden
his ATTORNEY

April 7, 1925.

R. A. WEAGANT

RADIO SIGNALING SYSTEM

Original Filed Feb. 7, 1919  2 Sheets-Sheet 2

1,532,356

INVENTOR
Roy Alexander Weagant
BY
Herbert H. Ogden
his ATTORNEY

Patented Apr. 7, 1925.

1,532,356

UNITED STATES PATENT OFFICE.

ROY ALEXANDER WEAGANT, OF DOUGLAS MANOR, NEW YORK, ASSIGNOR, BY MESNE ASSIGNMENTS, TO RADIO CORPORATION OF AMERICA, A CORPORATION OF DELAWARE.

RADIO SIGNALING SYSTEM.

Application filed February 7, 1919. Serial No. 275,552. Renewed August 27, 1924.

*To all whom it may concern:*

Be it known that I, ROY ALEXANDER WEAGANT, a citizen of the United States, and resident of Douglas Manor, county of Queens, city and State of New York, have invented certain new and useful Improvements in Radio Signaling Systems, of which the following is a specification, accompanied by drawings.

This invention relates to a new method and apparatus for eliminating or minimizing static interference in radio signaling, based upon my discovery as disclosed in my co-pending application Serial No. 181,458; that static disturbances behave as though due to vertically propagated heterogeneously polarized electro-magnet waves, while signals are recognized as vertically polarized horizontally propagated electro-magnetic waves. As in my said co-pending application, I utilize this difference in the direction of propagation to discriminate and distinguish between the effects due to static impulses and those due to signals.

In the illustrative apparatus shown in my co-pending application above referred to, the antennæ are separated by an appreciable fraction of a wave length in the general direction of reception and the system is adjusted so that the currents due to successively arriving signal waves are dissimilar in phase and utilized in a detector circuit, while the currents due to substantially simultaneously received static disturbances are similar in phase and are balanced out.

The primary object of the present invention is to avoid the necessity of widely separated antennæ or antennæ extending over considerable horizontal distances, to obtain effective wave length spacing, which forms of construction, although highly efficient and satisfactorily operative, introduce certain mechanical and electrical inconveniences due largely to the amount of space or territory covered by the antennæ.

I have devised a method of static elimination by means of which the vertically propagated static interference and the horizontally propagated signal waves may be received in an antenna system having relatively small aerials located at the receiving station, thus doing away with fractional wave length spacing between antennæ and the attendant inconveniences.

I have discovered that a plurality of antennæ, or portions of an antenna system may be associated at a receiving station in such manner that currents of substantially opposite phase, which may be balanced out, are produced therein by static impulses, while signal currents are produced in the antennæ in the same sense or direction and may be usefully retained.

These newly discovered attributes or properties of antennæ, by means of which I am enabled to discriminate between static and signal currents, without fractional wave length spacing, seem to be true of ungrounded linear oscillators arranged in the same vertical plane or in substantially parallel vertical planes, and oppositely inclined to the horizon or horizontal plane. As an equivalent construction electrically, antennæ may be employed having effective resultants extending along imaginary lines in space forming opposite angles with the horizon. Whether or not forms of antennæ or portions of an antenna system, other than linear oscillators, will effect the same results, when associated in the same or equivalent manner, I am unable at present to say, but I am not to be understood as limiting my invention to any particular form of antenna, for those skilled in the art may find equivalent constructions operating upon the same principles and in accordance with my method.

I can best describe my method by reference to the accompanying drawings showing preferred forms of my apparatus, in which—

Figure 1:
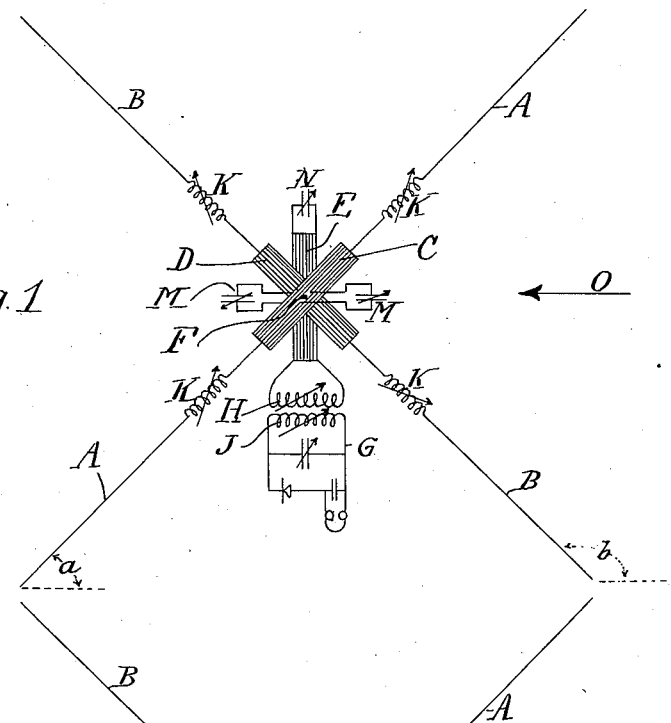
Figure 1 is a diagrammatic view showing two crossed aerials arranged in the same vertical plane and oppositely inclined to the horizon or the horizontal plane.

Referring to the drawings: The aerials in Figure 1, in the form of linear oscillators A and B, are arranged in this instance in the same vertical plane and connected through the coils C and D respectively of a radio goniometer, the movable coil E of which is pivoted for rotation about the axis F, and is suitably associated with a detector circuit G of any desired form. In the drawings I have shown the detector circuit G coupled to the movable coil E by the coupling coils H and J.

The aerials A and B are preferably comparatively short as for instance one hundred and fifty feet long more or less, and need only be of a length sufficient to obtain signals of the desired strength. These aerials as indicated are oppositely inclined to the horizontal plane or horizon; that is, antenna A may be considered as forming the angle $a$ with the horizontal and antenna B as forming the angle $b$. Antenna A is thus inclined toward that part of the horizon from which the signal is approaching, and antenna B is inclined away from that horizon, and although they are shown for convenience in the same vertical plane, they may of course be arranged in substantially parallel vertical planes or in other equivalent manner. Suitable means are provided for tuning the antennæ to the incoming signal, and in this instance variable tuning inductances K are provided in the antennæ, and variable condensers M are shown connected in series in the circuits of the goniometer coils C and D, preferably at the midpoints as indicated. A variable condenser N is also preferably connected in series with the movable coil E.

Although a system such as shown in Figure 1 receives signals equally well from a plurality of directions, let it be assumed that signals are coming in the direction indicated by the arrow O. The currents received by the antennæ A and B due to the signal waves will have the same direction and, if the wave fronts are vertical, these currents will be proportional to the sines of the angles $a$ and $b$ which the antennæ make with the horizontal plane. Even if the wave fronts are not exactly vertical, the currents will be approximately proportional to the sines of these angles, and will therefore be in the same sense or direction in the two antennæ A and B. The signal currents will produce a resultant magnetic field in the goniometer in a given direction making an angle of 45 degrees with the goniometer coils, the particular quarter of the goniometer in which said resultant lies being determined by the relative connection of the two coils. The sines of the angles $a$ and $b$ are of course both positive and equal, if the angles are supplementary.

On the other hand, vertically propagated waves due to static disturbances will be received in said antennæ A and B as currents proportional to the cosines of the angles $a$ and $b$ which the antennæ make with the horizontal plane. Since the angles $a$ and $b$ are in the first and second conventional trigonometric quadrants respectively, their cosines are positive and negative and the currents due to vertically propagated static disturbances are in opposite phase. For example, a vertically propagated wave polarized in the plane of the antennæ may set up a current from the top toward the bottom end in one antennæ, and from the bottom toward the top in the other antennæ. These static currents circulating in the goniometer coils, produce a resultant magnetic field at right angles to that produced by the signal currents and when the movable coil E of the goniometer is so adjusted that maximum current is generated therein by the signal waves it is in a position to have minimum current, and under ideal conditions, zero current, generated therein due to static waves. Other suitable means of associating the antennæ may be employed but because of convenience of manipulation and delicacy of adjustment, the radio goniometer is a preferable although not a necessary instrument.

Figure 2:
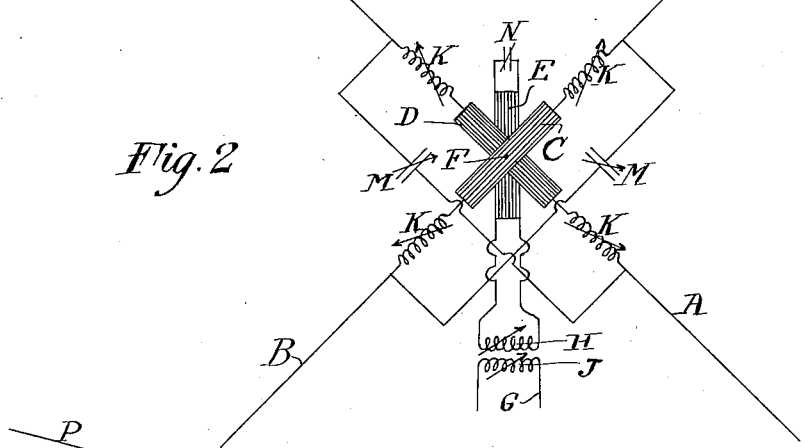
Figure 2 is a modification of Figure 1 showing a different connection for certain condensers.

Figure 2 is similar to Figure 1 except that the tuning condensers M are connected around the tuning inductances K and goniometer coils C and D, instead of in series as in Figure 1, because with small aerials so much inductance is not needed if the condensers are connected as described.

Figure 3:
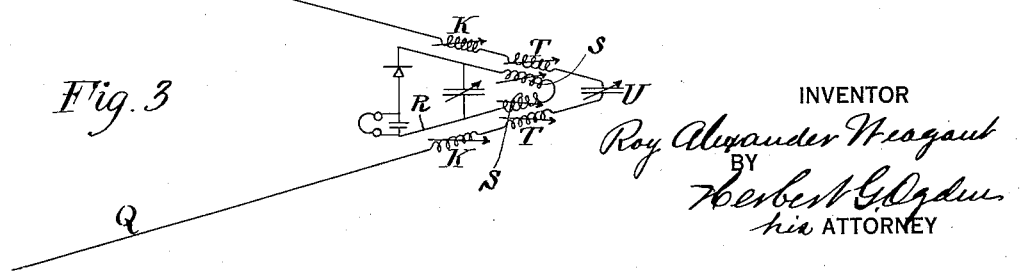
Figure 3 is another modification of Figure 1 in which the oppositely inclined superposed aerials are connected at their meeting ends and associated in a common circuit.

In the modification shown in Figure 3, the two inclined aerials P and Q instead of crossing at their mid-points are joined at their meeting ends, by means of which construction the currents due to static impulses are directly opposed to one another while the currents due to signal waves combine cumulatively. As in Figures 1 and 2, the signal and static currents are proportional respectively to the trigonometrical functions, that is, the sines and cosines of the angles which the aerials make with the horizontal plane or horizon.

In Figure 3 the aerials are associated with a suitable detector circuit R which, in this instance, is coupled to the aerials by means of the coupling coils S and T. Variable tuning inductances K are inserted in the aerials and a variable condenser U is preferably inserted in the aerials at their meeting point. The aerials P and Q in Figure 3 may be considered as one antenna or portions of an antenna system, and the aerials A and B in Figures 1 and 2 may also be considered as portions of a complete antenna system.

Figure 4:
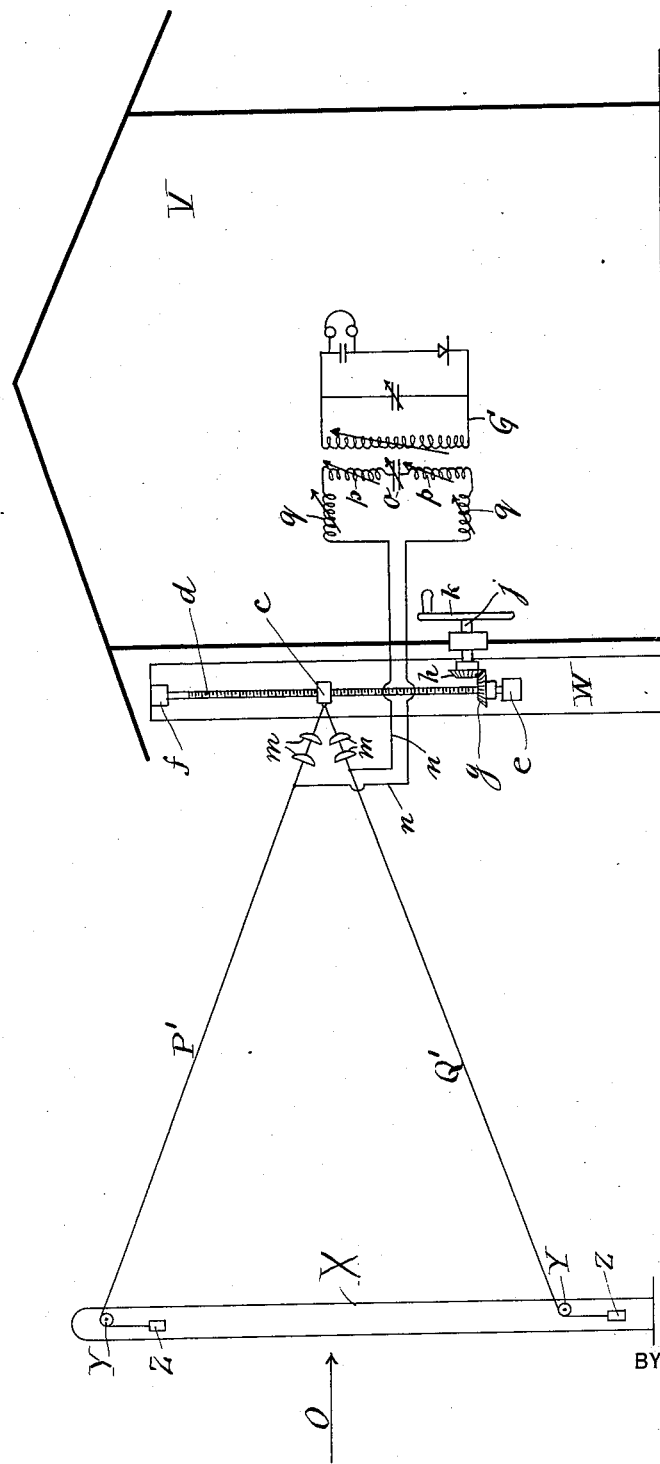
Figure 4 is a view similar to Figure 3 but having in addition means for varying the angles of the aerials with the horizontal.

In the modification of Figure 3 shown in Figure 4, provision is made for varying the angle between the aerials P' and Q', which also varies the angles they make with the horizontal plane, and by this means the intensities of the electro-motive forces in the aerials due to static impulses are varied and equalized.

In Figure 4, V represents a receiving house, and the aerials P' and Q' are supported on posts W and X. The further ends of the wires forming the aerials are carried over rollers Y and connected to weights Z as a convenient means for permitting relative movement between the wires. The meeting ends of the wires are connected to a nut $c$ traveling on a screw $d$ which is suitably supported on the post W in bearings $e$ and $f$, so that the nut $c$ may be adjusted vertically by manipulating the screw $d$. A bevel gear $g$ on the screw meshes with a pinion $h$ on shaft $j$ which extends into the house V and is provided with a hand wheel $k$ for rotating the screw. Any other suitable means may be provided for adjusting the meeting ends of the wires P' and Q' up and down to vary the angles.

Insulators $m$ are preferably provided in the aerials as shown and short leads $n$ connected to the aerials outside of the insulators are brought into the house. In the circuit of the leads are included the variable condenser $o$, the coupling coils $p$ and the variable tuning inductances $q$. The detector circuit G as shown is coupled to the coils $p$. The operation of the system is the same as that described in connection with Figure 3.

In all the forms of apparatus shown, the antennæ, or else portion of the antenna system are in the same vertical plane and extending at an angle to each other. All the antennæ shown are also preferably ungrounded either by direct connection to earth or by counterpoise.

In all of the figures, it is evident that antennæ in the same vertical plane will be affected by vertically propagated, heterogenously polarized waves, polarized in all planes except at right angles to the plane of the antennæ. To such waves polarized horizontally at right angles to the plane of the antennæ, the antennæ should be substantially unresponsive. The arrangements illustrated thus substantially eliminate all static interference which is vertically propagated.

The antenna systems disclosed herein also have the property of discriminating between signal waves of substantially the same wave length, but having wave fronts inclined at different angles to the horizontal plane. This is due to the fact that the angles of the antennæ to the said wave fronts are different. For instance, a strong nearby transmitting station will send waves having a more nearly vertical wave front than that produced by a weak far-off station. The signal waves may come from the same or different directions and by adjusting the movable coil of the goniometer, one signal may be excluded or minimized and the other retained. The basic method and apparatus covering the principle of adjusting the angle of the antenna relatively to the wave front is disclosed and claimed in my co-pending application, Serial No. 275,555.

By suitable adjustments of the goniometer or receiving circuits in my present arrangements, it will be obvious that the signal may be excluded and only static received. The system can thus be used as a "static tank" and the static balanced against static in an antenna receiving both static and signal, as in my co-pending applications, Serial Numbers 244,564 and 275,553.

The arrangements herein described have a special utility as a means of minimizing static disturbances in those cases, comparatively rare in my experience, where the predominant static is that due to thunderstorms and has a large horizontal component. In that case, the movable goniometer coil can be set at an angle corresponding to the field set up by such static disturbances. This reduces the signal intensity but it reduces the static intensity in much greater ratio and hence permits amplifying the signal to the desired or necessary extent, thus avoiding the disturbing effects of the static impulses so long as the signal and static wave fronts are not substantially identical.

In referring in my claims to linear oscillators or antennæ in the same plane, it will be understood that I do not exclude therefrom constructions having the antennæ in parallel planes as this is an equivalent arrangement, and in referring to antennæ as in a vertical plane, I do not exclude even considerable departures from the vertical so long as substantial results are secured by reason of approach toward the vertical.

I claim and desire to obtain by Letters Patent the following:

1. In radio reception, the method of minimizing static interference, which consists in simultaneously receiving signal waves and static waves from different directions with respect to the horizontal plane, balancing out the currents due to static waves and retaining the currents due to signal waves.

2. In radio reception, the method of minimizing static interference, which consists in simultaneously receiving signal waves and static waves from different directions with respect to the horizontal plane, balancing out the currents due to one kind of wave and retaining the other currents.

3. In radio reception, the method of minimizing static interference, which consists in simultaneously receiving signal waves and static waves from directions at right angles to each other with respect to the horizontal plane, balancing out the currents due to static waves with respect to said first direction and retaining the currents due to signal waves.

4. In radio reception, the method of minimizing static interference, which consists in simultaneously receiving signal waves and static waves from directions at right angles to each other with respect to the horizontal plane, balancing out the currents due to one kind of wave with respect to said first direction and retaining the other currents.

5. In radio reception, the method of minimizing static interference, which consists in simultaneously receiving signal waves from one direction with respect to the horizontal plane as currents substantially in the same phase and static impulses from another direction at right angles thereto with respect to said first direction as currents substantially in opposite phase, balancing out the static and retaining the signal currents.

6. In radio reception, the method of minimizing static interference, which consists in simultaneously receiving signal waves from one direction with respect to the horizontal plane as currents substantially in the same phase and static impulses from another direction at right angles thereto with respect to said first direction as currents substantially in opposite phase, balancing out currents due to one kind of wave and retaining the other currents.

7. In radio reception, the method of minimizing static interference, which consists in receiving in a plurality of antennæ, signal waves as currents substantially proportional to the sines of the effective angles of said antennæ with the horizontal plane, and static impulses as currents substantially proportional to the cosines of said angles, and selectively utilizing said currents.

8. In radio reception, the method of minimizing static interference, which consists in receiving in a plurality of antennæ, signal waves as currents substantially proportional to the sines of the effective angles said antennæ make with the horizontal plane, and static impulses as currents substantially proportional to the cosines of said angles, cumulatively combining the signal currents and differentially combining the static currents.

9. In radio signaling, the method of minimizing the interference of vertically propagated static impulses with the reception of horizontally propagated signal waves, which consists in controlling the relative phases and intensities of the currents due to said static impulses and signal waves in a plurality of antennæ substantially proportionally to the cosines and sines respectively of the effective angles of said antennæ with reference to the horizontal plane.

10. In radio reception, an antenna system having associated aerial portions substantially simultaneously affected by static impulses and signal waves, said portions being disposed in a manner such that the relative phases of the static and signal currents in one portion are different than the relative phases of said currents in another portion.

11. In radio reception, an antenna system having associated aerial portions substantially simultaneously affected by static impulses and signal waves, said portions being disposed in a manner such that the relative phases of the static and signal currents in one portion are different than the relative phases of said currents in another portion, and a receiving circuit associated therewith including means for selectively utilizing the desired effects.

12. In radio reception, an antenna system having associated aerial portions substantially simultaneously affected by static impulses and signal waves, said portions being disposed in a manner such that the relative phases of the static and signal currents in one portion are different than the relative phases of said currents in another portion, and a receiving circuit associated therewith including means for balancing out the static while retaining the signal currents.

13. In radio reception, an antenna system having portions in the form of associated linear oscillators substantially simultaneously affected by static impulses and signal waves, said portions being disposed in a manner such that the relative phases of the static and signal currents in one portion are different than the relative phases of said currents in another portion.

14. In radio reception, an antenna system having portions in the form of associated linear oscillators substantially simultaneously affected by static impulses and signal waves, said portions being disposed in a manner such that the relative phases of the static and signal currents in one portion are different than the relative phases of said currents in another portion, and a receiving circuit associated therewith including means for selectively utilizing the desired effects.

15. In radio reception, an antenna system having portions in the form of associated linear oscillators differently affected by static impulses, but similarly affected by vertically polarized, horizontally propagated signal waves, and a receiving circuit associated therewith including means for balancing out the static while retaining the signal currents.

16. In radio reception, an antenna system for receiving vertically polarized horizontally propagated waves having associated portions differently affected by static impulses and vertically polarized, horizontally propagated signal waves in a manner determined by the angular relation of said antenna portions to the respective directions of propagation of said static impulses and signal waves, said antenna portions being disposed at oblique angles with the horizontal in substantially the same vertical plane and means for selectively utilizing one of said effects and cancelling the other effect.

17. In radio reception, an antenna system for receiving vertically polarized horizontally propagated waves having associated portions disposed at oblique angles with the horizontal in substantially the same vertical plane, said antenna portions being differently affected by static impulses and vertically polarized, horizontally propagated signal waves in a manner determined by the angular relation of said antenna portions to the respective directions of propagation of said static impulses and signal waves, and a receiving circuit associated therewith including means for selectively utilizing one of said effects.

18. In radio reception, an antenna system having associated portions disposed at oblique angles with the horizontal in substantially the same vertical plane, said antenna portions being differently affected by static impulses and vertically polarized, horizontally propagated signal waves in a manner determined by the angular relation of said antenna portions to the respective directions of propagation of said static impulses and signal waves, and a receiving circuit associated therewith including means for balancing out the static while retaining the signal currents.

19. In radio reception, an antenna system having associated portions disposed at oblique angles with the horizontal in substantially the same vertical plane, said antenna portions being differently affected by static impulses and vertically polarized, horizontally propagated signal waves in a manner determined by the angular relation of said antenna portions to the respective directions of propagation of said static impulses and signal waves, and means for discriminating between the currents due to static disturbances and those due to signal waves.

20. In radio reception, an antenna structure for receiving vertically polarized horizontally propagated waves having portions in the form of linear oscillators oppositely inclined to the horizontal in substantially the same vertical plane and means for cumulatively combining the effects of said electromagnetic waves on said portions.

21. In radio reception, an antenna in the form of a linear oscillator having portions oppositely inclined to the horizontal in substantially the same vertical plane, thereby producing opposition of currents due to static impulses and like direction of currents due to signal waves in the said antenna and means associated with said antenna for cancelling the static currents while retaining the signal currents.

22. In apparatus of the kind described, a plurality of antennæ for receiving vertically polarized horizontally propagated waves in the form of linear oscillators in substantially the same vertical plane and having effective resultants inclined at an angle to each other, one making a greater and the other making a lesser angle with the horizontal than is made by the direction of propagation of the static waves, said antennæ being provided with a coupling means, and a receiving circuit associated with said coupling means for cumulatively combining said vertically polarized, horizontally propagated waves.

23. In apparatus of the kind described, a plurality of antennæ for receiving vertically polarized horizontally propagated waves in the form of linear oscillators in substantially the same vertical plane and inclined at an angle to each other, one making a greater and the other making a lesser angle with the horizontal than is made by the direction of propagation of the static waves, said antennæ being provided with a coupling means and a receiving circuit associated with said coupling means for cumulatively combining said vertically polarized, horizontally propagated waves.

24. In apparatus of the kind described, a plurality of antennæ in the form of linear oscillators crossing each other in substantially the same vertical plane at oblique angles with the horizontal plane, one making a greater and the other making a lesser angle with the horizontal than is made by the direction of propagation of the static waves, and a receiving circuit associated therewith including means for balancing out currents due to static disturbances while retaining currents due to signal waves.

25. In apparatus of the kind described, a plurality of antennæ in the form of linear oscillators in substantially the same vertical plane, said oscillators having effective resultants forming oblique angles with the horizontal plane, one making a greater and the other making a lesser angle with the horizontal than is made by the direction of propagation of the static waves, and a receiving circuit associated with said antennæ including means for balancing out currents due to static disturbances while retaining currents due to signal waves.

26. In apparatus of the kind described, an antenna system for receiving vertically polarized horizontally propagated waves having portions arranged to be similarly affected by said vertically polarized, horizontally propagated signal waves, said portions being inclined at different effective angles to the line of propagation of static waves, and means for selectively utilizing the currents due to one of said waves and cancelling the currents due to the other of said waves.

27. In apparatus of the kind described, a linear oscillator antenna system for receiving vertically polarized horizontally propagated waves having portions arranged to be similarly affected by said vertically polarized, horizontally propagated signal waves, said portions being effectively oppositely inclined to the line of propagation of static waves, and means for selectively utilizing the currents in said portions due to one of said waves and cancelling the currents due to the other of said waves.

28. In apparatus of the kind described, an ungrounded linear oscillator antenna system having portions arranged to be similarly affected by desired signal waves, said portions being effectively oppositely inclined to the line of propagation of static waves, and means for selectively utilizing the currents in said portions due to said desired waves.

29. In a radio communication system, an antenna system for receiving vertically polarized horizontally propagated waves having portions arranged to be similarly affected by said horizontally propagated vertically polarized waves, said portions being effectively oppositely inclined to the line of propagation of heterogeneously polarized waves from another direction, and means for selectively utilizing currents due to waves from one of said directions and cancelling currents due to waves from the other of said directions.

30. In a radio communication system, an antenna system for receiving vertically polarized horizontally propagated waves having portions arranged to be similarly affected by said horizontally propagated vertically polarized waves, said portions being effectively oppositely inclined to the line of propagation of heterogeneously polarized waves from another direction, said antenna system being blind to such of said heterogeneously polarized waves as are polarized parallel to one axis of said antenna system, and means for selectively utilizing currents due to waves from one of said directions and cancelling currents due to waves from the other of said directions.

31. In a radio communication system, an ungrounded linear oscillator antenna system having portions arranged to be similarly affected by horizontally propagated vertically polarized waves, said portions being effectively oppositely inclined to the line of propagation of heterogeneously polarized waves from another direction, said antenna system being blind to such of said heterogeneously polarized waves as are polarized at right angles to said portions and means for selectively utilizing currents due to waves from one of said directions.

32. In a radio communication system, an antenna system having portions arranged to be similarly affected by horizontally propagated vertically polarized waves, said portions being effectively oppositely inclined to the direction of propagation of heterogeneously polarized waves from another direction, said antenna system being blind to such of said heterogeneously polarized waves as are polarized in a certain direction, means associated with said system for selectively opposing effects in said portions due to one of said sorts of waves, and means for utilizing effects due to the other sort.

33. In apparatus of the kind described, an antenna system for receiving vertically polarized horizontally propagated waves having portions effectively oppositely inclined in a vertical plane to the direction of propagation of both vertically polarized, horizontally propagated signal and static waves, and similarly sensed as to one sort of wave with respect to corresponding ends of said antenna portions, but oppositely sensed as to the other sort of wave, and a common receiving circuit associated with said portions for cumulatively combining currents due to one of said waves and differentially combining the currents due to the other of said waves.

34. In apparatus of the kind described, an antenna system effectively receptive to waves from one direction, but ineffectively receptive to waves from another direction, said system comprising portions oppositely inclined to said directions of propagation, and a common receiving circuit associated therewith, said oppositely inclined antenna portions affecting said common receiving circuit differentially by waves in one direction, and cumulatively by waves in the other direction.

35. In radio reception, an antenna system having associated portions substantially simultaneously affected by static impulses and signal waves, said portions being disposed in a manner such that the relative phases of the static and signal currents in one portion are different than the relative phases of said currents in another portion, and a receiving circuit associated therewith at the central portion of the antenna system including means for selectively utilizing the desired effects.

36. In radio reception, an antenna system having portions in the form of associated linear oscillators, substantially simultaneously affected by static impulses and signal waves, said portions being disposed in a manner such that the relative phases of the static and signal currents in one portion are different than the relative phases of said currents in another portion, and a receiving circuit associated therewith at the central portion of the antenna system including means for selectively utilizing the desired effects.

In testimony whereof I have signed this specification in the presence of two subscribing witnesses.

ROY ALEXANDER WEAGANT.

Witnesses:
M. H. PAYNE,
HERBERT G. OGDEN.